United States Patent
Bean et al.

(10) Patent No.: US 10,372,516 B2
(45) Date of Patent: Aug. 6, 2019

(54) MESSAGE PROCESSING

(71) Applicant: International Business Machines Corporation, Armonk, NY (US)

(72) Inventors: Chris R. Bean, Hampshire (GB); Matthew R. Whitehead, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 37 days.

(21) Appl. No.: 15/659,123

(22) Filed: Jul. 25, 2017

(65) Prior Publication Data

US 2019/0034249 A1 Jan. 31, 2019

(51) Int. Cl.
G06F 9/54 (2006.01)
G06F 9/48 (2006.01)

(52) U.S. Cl.
CPC ............... *G06F 9/546* (2013.01); *G06F 9/48* (2013.01)

(58) Field of Classification Search
CPC .................................................... G06F 9/546
USPC .................................................. 719/313, 314
See application file for complete search history.

(56) References Cited

U.S. PATENT DOCUMENTS

| | | | | |
|---|---|---|---|---|
| 8,381,278 | B2* | 2/2013 | Thyagarajan | G06F 9/5027 713/152 |
| 8,978,041 | B2* | 3/2015 | Allen | G06F 9/5038 719/313 |
| 9,363,301 | B2 | 6/2016 | Lawson et al. | |
| 2016/0124742 | A1 | 5/2016 | Rangasamy et al. | |
| 2017/0366492 | A1* | 12/2017 | Ho | H04L 67/2814 |
| 2018/0054302 | A1* | 2/2018 | Shveykin | H04L 9/083 |

FOREIGN PATENT DOCUMENTS

| | | |
|---|---|---|
| CN | 105162884 | 12/2015 |
| WO | WO 0173547 | 10/2001 |

OTHER PUBLICATIONS

Kang et al., Container and Microservice Driven Design for Cloud Infrastructure Devops, Source: Published in: Cloud Engineering (IC2E), 2016 IEEE International Conference on Date of Conference: Apr. 4-8, 2016, Retrieved from Internet: URL: http://ieeexplore.ieee.org/document/7484185/, 3 pages.

Richardson, Building Microservices: Inter-Process Communication in a Microservices Architecture, Retrieved from Internet Jul. 25, 2017; URL: https://www.nginx.com/blog/building-microservices-inter-process-communication/, 19 pages.

(Continued)

*Primary Examiner* — Andy Ho
(74) *Attorney, Agent, or Firm* — Schmeiser, Olsen & Watts, LLP; William Hartwell

(57) ABSTRACT

A method and system for processing a message of a messaging system. The messaging system includes a messaging engine and a set of messages. A messaging endpoint of each message of the set of messages is associated with a respective container configured to run an associated application. In response to a first message being published to a messaging endpoint of the first message, the container associated with the messaging endpoint of the first message is used to process the message.

12 Claims, 4 Drawing Sheets

(56) References Cited

OTHER PUBLICATIONS

Default messaging provider topic connection factory [Settings], Retrieved from Internet Jul. 25, 2017; URL:http://www.ibm.com/support/knowledgecenter/SSAW57_8.5.5/com.ibm.websphere.nd.doc/ae/SIBJMSTopicConnectionFactory_DetailForm.html, 13 pages.
Starting IBM MQ applications using triggers, IBM Knowledge Center, Retrieved from Internet Jan. 22, 2017; URL: http://www.ibm.com/support/knowledgecenter/SSFKSJ_8 .0.0/com.ibm.mq.dev.doc/q0269, 2 pages.

* cited by examiner

MESSAGE PROCESSING

TECHNICAL FIELD

The present invention relates to processing a message such as a message communicated for invoking an application.

BACKGROUND

Services are typically requested and deliverables typically returned in the form of messages between computers (or between software applications running on these computers).

For example, messaging is commonly used to request services (such as micro-services) in scalable and distributed Information Technology (IT) systems because of the way the messaging can provide a buffer or "shock-absorber" between the requesting application and the service. If the service is busy processing data from another application for example, new requests can be queued until an instance of the service becomes available.

To cater for the large number of applications an organization might have running at one time (and thus the associated large workload), it is common for a service to be scaled to multiple instances.

SUMMARY

Embodiments of the present invention provide a method, and associated computer system and computer program product, for processing a message of a messaging system. One or more processors of the computer system associate a messaging endpoint of each message of the set of messages with a respective container configured to run an associated application. In response to a first message being published to a messaging endpoint of the first message, the one or more processors use the container associated with the messaging endpoint of the first message to process the message.

BRIEF DESCRIPTION OF THE DRAWINGS

Preferred embodiments of the present invention will now be described, by way of example only, with reference to the following drawings.

DETAILED DESCRIPTION

Figure 1:
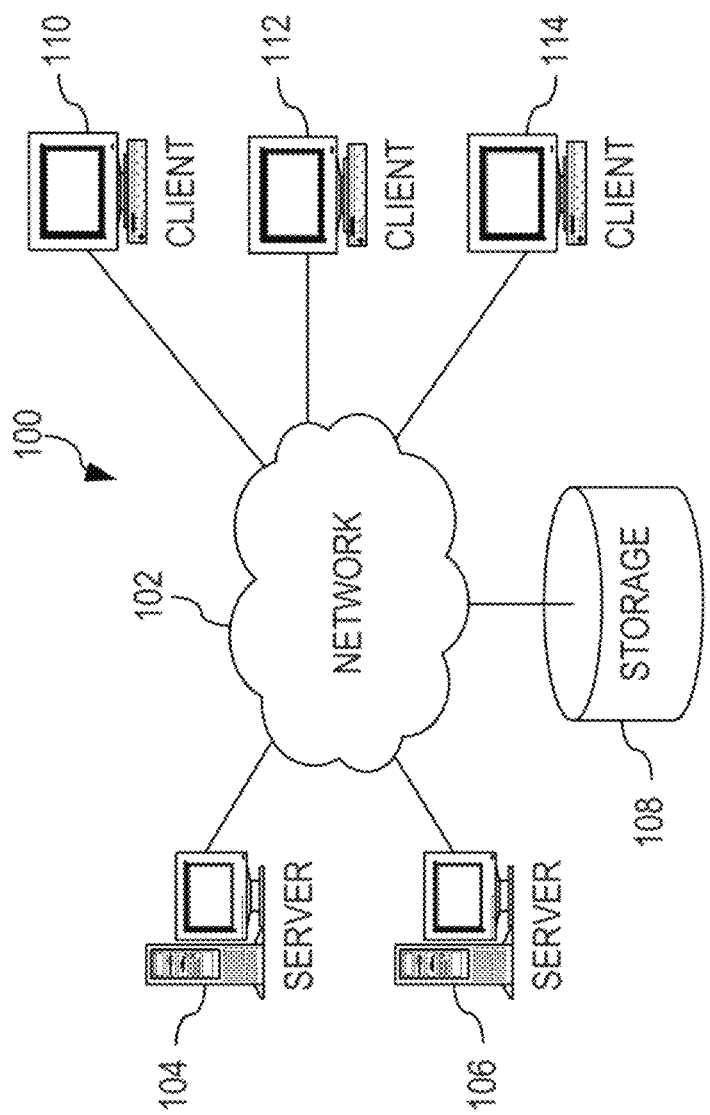
FIG. 1 depicts a pictorial representation of an example distributed system in which aspects of illustrative embodiments of the present invention may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that, in one embodiment, such a method may be a process for execution by a computer, wherein the method is a computer-implementable method. In this embodiment, the various steps of the method therefore reflect various parts of a computer program; e.g., various parts of one or more algorithms.

In other embodiments, the method may be implemented by hardware rather than software.

Also, in the context of the present application, a (message processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

In one embodiment, the present invention provides a method for processing a message that can provide support for invoking applications or services in scalable service architectures.

In one embodiment, the present invention provides a computer program product including computer program code for implementing the method when executed on a processor of a data processing system.

In one embodiment, the present invention provides a message processing system adapted to execute this computer program code.

The present invention implements processing a message wherein a messaging endpoint (such as a message topic or a queue for example) may be mapped to a service (based on association or configuration of the messaging engine for example). By mapping a message to an associated service, an original requesting application may not need to be modified to work with scalable services. Unlike conventional messaging systems (wherein a requesting application needs to be aware of the available services), proposed embodiments may enable a requesting application to be unaware of service and thus not require any changes.

Embodiments may therefore avoid the need for a message to comprise an explicit request for a service (such as a micro-service for example).

For instance, the present invention may support a transition to micro-services by using a configuration of an existing message engine to allow requesting applications (e.g., message originators or publishing applications) to remain unchanged. The requesting applications may, for example, be agnostic of the type of application services servicing requests. In such circumstances, embodiments may employ containers (such as virtual containers or docker containers) to run the application(s) for implementing the service(s).

Illustrative embodiments may therefore include analyzing a message to determine the most appropriate container for processing the message data. Dynamic message optimization may therefore be provided by embodiments of the present invention.

Embodiments may be at least partly based on the realization that containers (such as docker containers) may be used to run required applications. Containers may wrap a piece of software (such as an application) in a complete file system that contains everything needed to run: code, runtime, system tools, system libraries—anything that can be installed on a server for example, which may help to guarantee that the application will always run the same, regardless of the application's environment. Containers may have the benefit of being lightweight, since containers running on a single machine may share the same operating system kernel (thereby starting instantly and using less RAM for example). Containers may be constructed from layered file systems and share common files, making disk usage and downloads more efficient. Containers may also isolate applications from one another and the underlying infrastructure, while providing a layer of protection for the application. Furthermore, containers (such as virtual containers or docker containers for example) may be based on open standards, thus enabling containers to run on various operating systems and on top of any infrastructure. Unlike virtual machines, a container implemented by embodiments may share the operating system with other container, running as an isolated process in space on a host operating system. Containers employed by embodiments may therefore need not be tied to any specific infrastructure. The isolation capabilities of containers may free developers of services from constraints so that the most appropriate language and tools may be used without concern for causing conflicts.

Embodiments may employ associating messaging endpoints (which may be in the form of a topic pattern such as "data/files/translate/#") with respective containers (using container unique identifier, UIDs, for example) which are each configured to run a required application. When a message is published to a message endpoint (e.g., data/files/translate/Portuguese"), the message engine may match the topic with an endpoint ("data/files/translate/#") and provide the message to associated container, which may involve provisioning a new container instance or allocating an existing, idle container. Also, some environment data may be passed to the container so as to provide the container with information for facilitating the messaging engine connection, application execution, etc.

In some embodiments, a messaging end point may comprise identification information of a container associated with the messaging end point. In this way, messages may specify a container identifier (ID) that should be used to process the messages, which may have the advantage of not requiring a message engine to know endpoint-to-container mappings. In other words, messages employed by embodiments may be configured to include all the information required to provision a container and process the message.

Many different ways to determine a container for processing a message may be employed by embodiments, and may be implemented in isolation or in combination. Modifications and additional steps to a traditional message processing system may also be implemented which may enhance the value and utility of the present invention.

Illustrative embodiments may be utilized in many different types of messaging processing environments. Illustrative embodiments may, for example, be employed in relation to rarely used services that do not have very low latency requirements, or to services which are used intensively but for a short period of time. For example, it may be common for large numbers of messages to be input into the system at a given time (for example when a football match starts that requires the use of lots of statistics, social, and sport related services for a couple of hours) but then the services may not be required for several hours or days and can be shutdown entirely.

Embodiments may check for a newer (e.g., updated) version of a container before invoking the container. Thus, in the event that a new version of a service is required, embodiments may be adapted to specify a new container UID which runs an updated version of the service. From then on, subsequent requests may cause that new container level to be provisioned without having to manually push the applications.

Also, embodiments may employ, as part of the mapping configuration, a configuration of a number or containers to run concurrently for each mapping.

Figure 2:
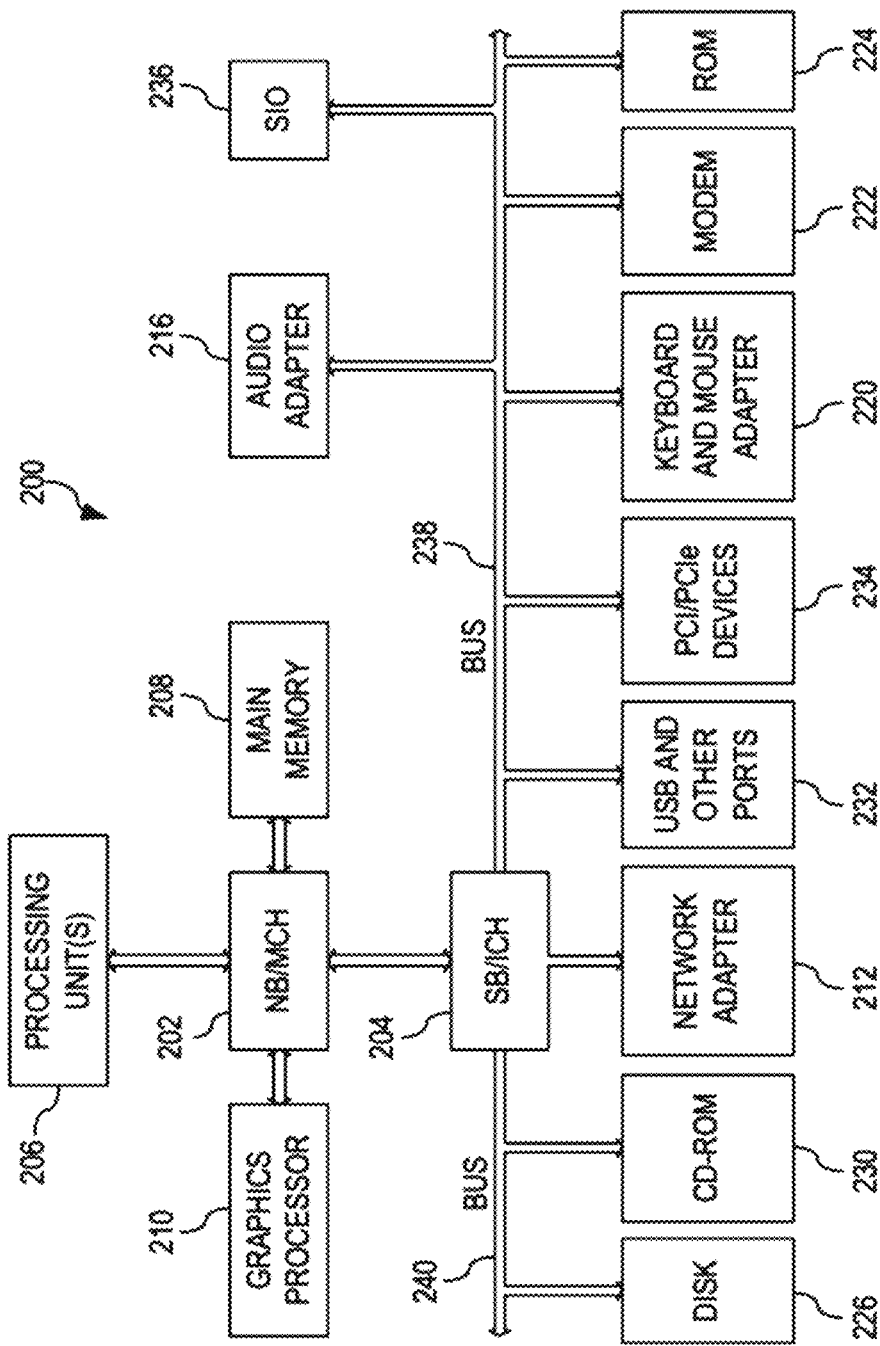
FIG. 2 is a block diagram of an example message processing system in which aspects of illustrative embodiments of the present invention may be implemented.

In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of illustrative embodiments of the present invention may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 may be the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example message processing system 200 in which aspects of illustrative embodiments of the present invention may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. One or more processing units 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system may run in conjunction with the operating system and provide calls to the operating system from programs or applications.

As a server, system 200 may be a computer system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

The present invention may enhance a message processing system by reducing re-parsing costs or making operations (such as serialization) more efficient. Embodiments may enable a data format to be identified and then used during the forwarding on of message data, which can extend or improve the processing capabilities or efficiency of a Service Oriented Architecture (SOA) system.

Figure 3:
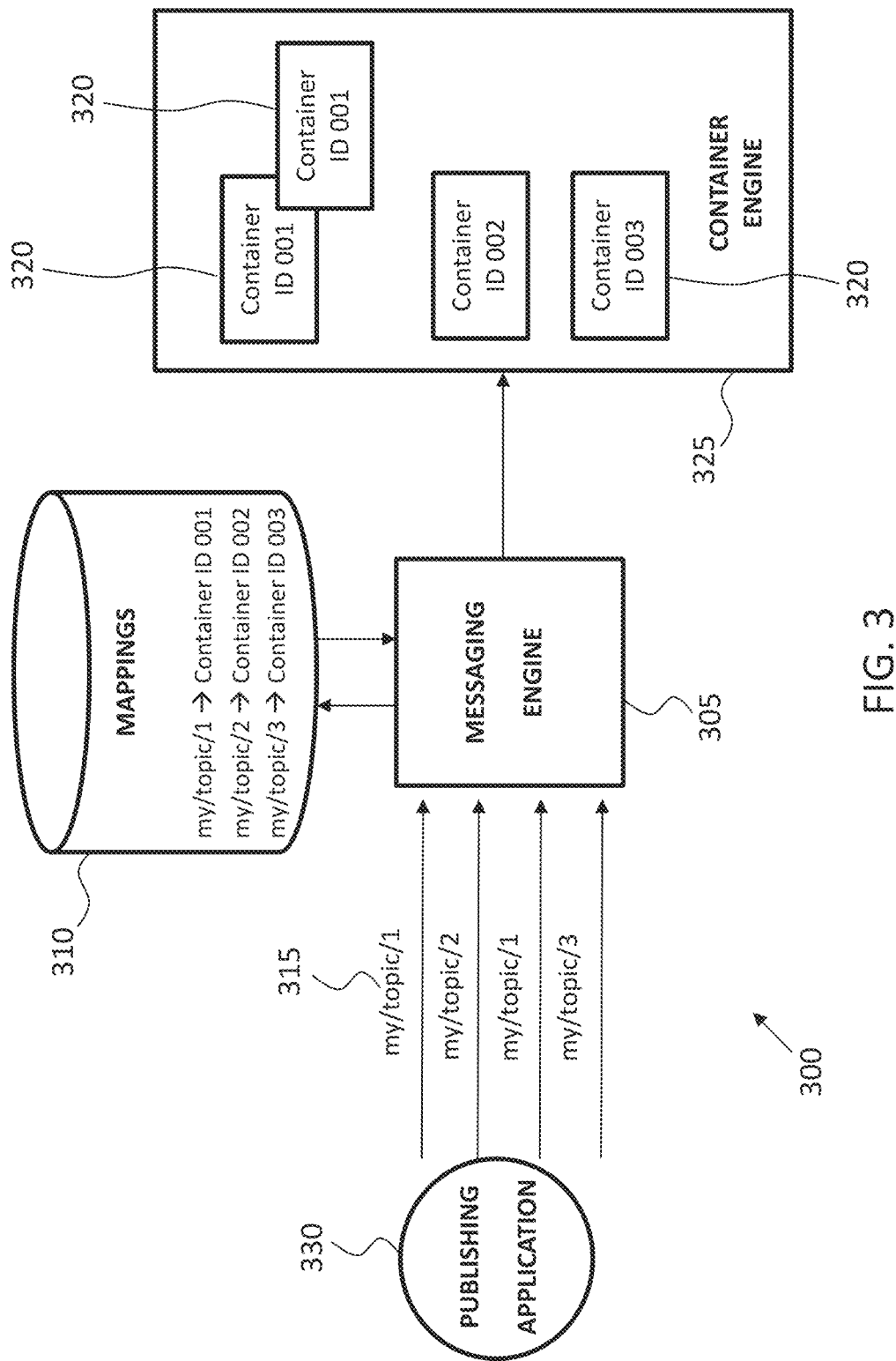
FIG. 3 depicts a schematic block diagram of an exemplary embodiment of the present invention.

FIG. 3 depicts a schematic block diagram 300 of an exemplary embodiment of the present invention. The embodiment may be suitable for processing a message of a messaging system, and may comprise a messaging engine 305 and a data storage unit 310.

The data storage unit 310 may comprise information representative of associations of messaging endpoints 315 with respective containers 320 adapted to run an associated application. Each container 320 may be provisioned by a container engine 325. In this way, a messaging endpoint of each message of a set of messages may be associated with (e.g., linked or mapped to) a respective container.

Each container may be adapted to wrap its associated application in a file system comprising the resources necessary to run the application. Thus, each container may comprise the container's associated application (in the form of a micro-service for example) and dependencies. For instance, a container may comprise a docker container that is adapted to share an operating system kernel with another docker container.

Also, a messaging endpoint may comprise a description of a message topic, and examples may include: "my/topic/1"; "my/topic/2"; and "my/topic/3".

Accordingly, the embodiment of FIG. 3 may employ a concept of associating messaging endpoints (e.g., in the form of a topic pattern such as "my/topic/#") with respective containers (using container unique identifier, UIDs, such as "ID 00#" for example), wherein # denotes 1, 2, 3, . . . .

In response to a first message (such as an API request) being published by a publishing application 330 to a messaging endpoint 315 (e.g., "my/topic/1"), the messaging engine 305 may receive the first message and then analyze the first message to determine the first message's intended messaging endpoint. Based on the identified endpoint, the messaging endpoint 305 may interrogate the data storage 310 to identify the container associated with the intended messaging endpoint of the first message. For example, based on the receiving the messaging endpoint "my/topic/1", the messaging engine 305 may query the database 310 which, in turn, returns the container UID "Container ID 001" to the messaging engine 305.

The messaging engine 305 may then use the identified container "Container ID 001" to process the first message.

Thus, a message is published to a message endpoint (e.g., "my/topic/2"), the message engine 305 may use information stored by the data storage unit 310 to match the topic with a container (e.g., "Container ID 002") and then provide the message and/or message data to the associated container, which may involve the container engine 320 provisioning a new container instance or allocating an existing, idle container.

It is also noted that some supplementary (e.g., environmental) data may be passed to the container so as to provide the container with information for facilitating the messaging engine connection, application execution, etc. Such information may be stored/provided by the data storage unit 310 and/or the messaging engine 305, respectively, and may include connection details the container needs to create a connection to the messaging system.

Although the embodiment of FIG. 3 has been described above as employing messages endpoints that are then used to identify associated containers, it is also envisaged that, in some embodiments, a messaging end point may also comprise identification information of a container associated with the messaging end point. In this way, messages may actually specify a container identifier (e.g., ID number). Such identification of a container may, for example, indicate a preference or a requirement, which may have the advantage of not requiring a message engine to know endpoint-to-container mappings. Thus, a message employed by embodiments may be configured to include all of the information required to provision a container and process the message.

Embodiments have been described as employing end points which are directed to topics. In other embodiments, a messaging end point may address a queue or other non-topics.

In some embodiments, there may be provided a system comprising a processing arrangement adapted to carry out any method previously described with reference to FIGS. 1 to 3.

Figure 4:
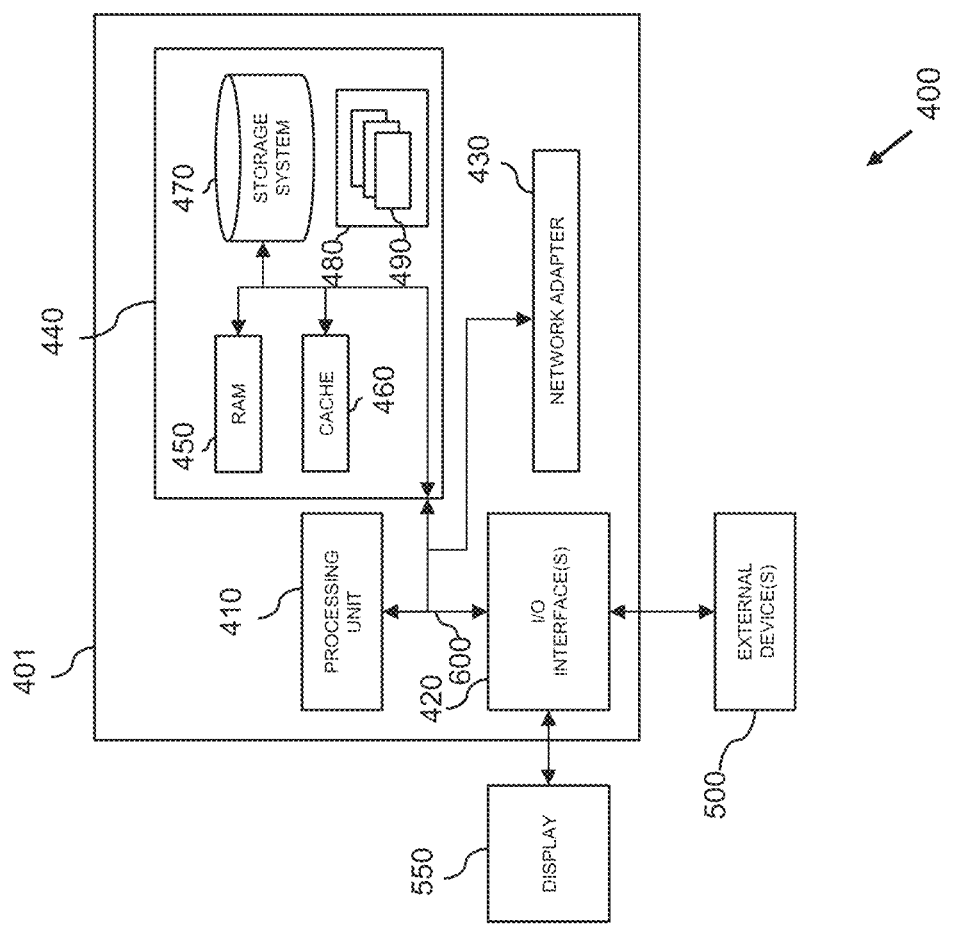
FIG. 4 is a block diagram of a networked system comprising a computer system which may be used to implement embodiments of the present invention.

FIG. 4 is a block diagram of a networked system 400 comprising a computer system 401 which may be used to implement embodiments of the present invention. The components of computer system/server 401 may include, but are not limited to, one or more processing arrangements, for example comprising processors or processing units 410, a system memory 440, and a bus 600 that couples various system components including system memory 440 to processing unit 410.

Bus 600 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 401 typically includes a variety of computer system readable media. Such media may be any available media that is accessible by computer system/server 401, and it includes both volatile and non-volatile media, removable and non-removable media.

System memory 440 can include computer system readable media in the form of volatile memory, such as random access memory (RAM) 450 and/or cache memory 460. Computer system/server 401 may further include other removable/non-removable, volatile/non-volatile computer system storage media. By way of example only, storage system 470 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 600 by one or more data media interfaces. As will be further depicted and described below, memory 440 may include at least one program product having a set (e.g., at least one) of program modules that are configured to carry out the functions of embodiments of the invention.

Program/utility 480, having a set (at least one) of program modules 490, may be stored in memory 440 by way of example, and not limitation, as well as an operating system, one or more application programs, other program modules, and program data. Each of the operating system, one or more application programs, other program modules, and program data or some combination thereof, may include an implementation of a networking environment. Program modules 490 generally carry out the functions and/or methodologies of embodiments of the invention as described herein.

Computer system/server 401 may also communicate with one or more external devices 500 such as a keyboard, a pointing device, a display 550, etc.; one or more devices that enable a user to interact with computer system/server 401; and/or any devices (e.g., network card, modem, etc.) that enable computer system/server 401 to communicate with one or more other computing devices. Such communication can occur via Input/Output (I/O) interfaces 420. Still yet, computer system/server 401 can communicate with one or more networks such as a local area network (LAN), a general wide area network (WAN), and/or a public network (e.g., the Internet) via network adapter 430. As depicted, network adapter 430 communicates with the other components of computer system/server 401 via bus 600. It should be understood that although not shown, other hardware and/or software components could be used in conjunction with computer system/server 401. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a message of a messaging system, said method comprising:
   determining, by one or more processors of a computer system from analysis of the message, a messaging endpoint for the message, by matching a topic associated with the message to a message topic described by the messaging endpoint;
   in response to the message being published to the messaging endpoint after said determining the messaging endpoint, determining, by the one or more processors from stored associations between messaging endpoints and respective containers, a container, wherein each respective container comprises an application associated with said each respective container;
   sending, by the one or more processors, the message to the container previously determined from the stored associations;
   executing the application comprised by the container, via the one or more processors, to process the message previously sent to the container.

2. The method of claim 1, wherein each container is configured to wrap each container's associated application in a file system comprising all resources necessary to run each container's associated application.

3. The method of claim 1, wherein each container comprises each container's associated application and dependencies and is adapted to share a same operating system kernel with another container of the respective containers.

4. The method of claim 1, wherein the method comprises:
   checking for an updated version of the container and in response to identification of an updated version of the container executing the application comprised by the updated version of the container.

5. The method of claim 1, wherein the messaging end point of the message comprises identification information of the container associated with the messaging end point of the message.

6. The method of claim 1, wherein the application associated with the container associated with the messaging endpoint of the message comprises a micro-service.

7. A computer program product, comprising one or more computer readable hardware storage devices having computer readable program code stored therein, said program code containing instructions executable by one or more processors of a computer system to implement a method for processing a message of a messaging system, said method comprising:
   determining, by the one or more processors from analysis of the message, a messaging endpoint for the message, by matching a topic associated with the message to a message topic described the messaging endpoint;
   in response to the message being published to the messaging endpoint after said determining the messaging endpoint, determining, by the one or more processors from, stored associations between messaging endpoints and respective containers, a container, wherein each respective container comprises an application associated with said each respective container;
   sending, by the one or more processors, the message to the container previously determined from the stored associations;
   executing the application comprised by the container, via the one or more processors, to process the message previously sent to the container.

8. The computer program product of claim 7, wherein each container is configured to wrap each container's associated application in a file system comprising all resources necessary to run each container's associated application.

9. The computer program product of claim 7, wherein each container comprises each container's associated application and dependencies and is adapted to share a same operating system kernel with another container of the respective containers.

10. A computer system, comprising one or more processors, one or more memories, and one or more computer readable hardware storage devices, said one or more hardware storage device containing program code executable by the one or more processors via the one or more memories to implement a method for processing a message of a messaging system, said method comprising:
    determining, by the one or more processors from analysis of the message, a messaging endpoint for the message, by matching a topic associated with the message to a message topic described by the messaging endpoint;
    in response to the message being published to the messaging endpoint after said determining the messaging endpoint, determining, by the one or more processors from, stored associations between messaging endpoints and respective containers, a container, wherein each respective container comprises an application associated with said each respective container;
    sending, by the one or more processors, the message to the container previously determined from the stored associations;
    executing the application comprised by the container, via the one or more processors, to process the message previously sent to the container.

11. The computer system of claim 10, wherein each container is configured to wrap each container's associated application in a file system comprising all resources necessary to run each container's associated application.

12. The computer system of claim 10, wherein each container comprises each container's associated application and dependencies and is adapted to share a same operating system kernel with another container of the respective containers.

* * * * *